US010403057B1

(12) United States Patent
Fawcett et al.

(10) Patent No.: US 10,403,057 B1
(45) Date of Patent: Sep. 3, 2019

(54) SYSTEM AND METHOD FOR ANALYZING TELEMATICS DATA

(71) Applicant: Nationwide Mutual Insurance Company, Columbus, OH (US)

(72) Inventors: David E. Fawcett, Hilliard, OH (US); Tom R. Elston, Reynoldsburg, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 130 days.

(21) Appl. No.: 15/461,127

(22) Filed: Mar. 16, 2017

Related U.S. Application Data

(60) Provisional application No. 62/428,740, filed on Dec. 1, 2016.

(51) Int. Cl.
| | |
|---|---|
| *G07C 5/04* | (2006.01) |
| *G07C 5/00* | (2006.01) |
| *G06Q 40/08* | (2012.01) |
| *G01S 19/52* | (2010.01) |
| *G01S 19/42* | (2010.01) |

(52) U.S. Cl.
CPC ............... *G07C 5/04* (2013.01); *G06Q 40/08* (2013.01); *G07C 5/008* (2013.01); *G01S 19/42* (2013.01); *G01S 19/52* (2013.01)

(58) Field of Classification Search
CPC ........ G06Q 40/00; G06Q 40/08; G06Q 10/08; G06Q 50/30
USPC ................. 701/29.1, 409; 705/4, 26.8, 26.81
See application file for complete search history.

(56) References Cited

U.S. PATENT DOCUMENTS

| | | | | |
|---|---|---|---|---|
| 9,390,451 | B1* | 7/2016 | Slusar | G06Q 40/04 |
| 9,493,171 | B2* | 11/2016 | Filev | B60W 50/16 |
| 2009/0077229 | A1* | 3/2009 | Ebbs | G08G 1/207 |
| | | | | 709/224 |
| 2014/0278574 | A1* | 9/2014 | Barber | B60W 40/09 |
| | | | | 705/4 |
| 2016/0236790 | A1* | 8/2016 | Knapp | B64C 11/001 |
| 2017/0053554 | A1* | 2/2017 | Nalepka | G09B 19/167 |
| 2017/0053555 | A1* | 2/2017 | Angel | G09B 19/167 |
| 2017/0206717 | A1* | 7/2017 | Kuhnapfel | H04L 67/22 |

* cited by examiner

*Primary Examiner* — Thomas G Black
*Assistant Examiner* — Wae L Louie
(74) *Attorney, Agent, or Firm* — Morgan Lewis & Bockius, LLP

(57) ABSTRACT

A vehicle data collection and evaluation system. A vehicle data collection device is configured to collect the data associated with the operation of the vehicle. A transmitter is configured to transmit the collected data. An analytics server is configured to receive the collected data transmitted by the transmitter and to process the collected data. A rate processing server configured to determine a driver safety rating. The collected data comprises vehicle speed measured at a predetermined time interval and the analytics server (i) determines a change in speed value over the predetermined time interval and raises the change in speed value to an exponential power to determine an exponentiated change in speed value; (ii) determines a maximum speed of the vehicle during the predetermined time interval; and (iii) determines the driver safety rating based on the maximum speed and a magnitude of the exponentiated change in speed value relative to a distance traveled over the predetermined time interval.

8 Claims, 2 Drawing Sheets

SYSTEM AND METHOD FOR ANALYZING TELEMATICS DATA

CROSS REFERENCE TO RELATED APPLICATIONS

The application claims priority to U.S. Provisional Patent Application No. 62/428,740, filed Dec. 1, 2016, which is incorporated by reference herein in its entirety.

FIELD OF THE INVENTION

The invention relates to methods and systems for analyzing telematics data originating from motor vehicle systems.

BRIEF SUMMARY OF THE INVENTION

Embodiments of the invention are further directed to a vehicle data collection and evaluation system. A vehicle data collection device is configured to collect the data associated with the operation of the vehicle. A transmitter is configured to transmit the collected data. An analytics server is configured to receive the collected data transmitted by the transmitter and to process the collected data. A rate processing server configured to determine a driver safety rating. The collected data comprises vehicle speed measured at a predetermined time interval and the analytics server (i) determines a change in speed value over the predetermined time interval and raises the change in speed value to an exponential power to determine an exponentiated change in speed value; (ii) determines a maximum speed of the vehicle during the predetermined time interval; and (iii) determines the driver safety rating based on the maximum speed and a magnitude of the exponentiated change in speed value relative to a distance traveled over the predetermined time interval.

Other embodiments of the invention are directed to systems and methods for collecting and evaluating data associated with the operation of a vehicle. A device is configured to collect the data associated with the operation of the vehicle. A transmitter is configured to transmit the collected data. A processor is configured to receive the collected data transmitted by the transmitter and process the collected data to determine a driver safety rating. The collected data includes vehicle speed measured at a predetermined time interval. The processor (i) determines a change in speed value over the time interval and raises the change in speed value to an exponential power to determine an exponentiated change in speed value; (ii) determines a maximum speed of the vehicle during the predetermined time interval; and (iii) determines the driver safety rating based on the maximum speed and a magnitude of the exponentiated change in speed value relative to a distance traveled over the predetermined time interval.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE EXEMPLARY EMBODIMENTS

Figure 1:
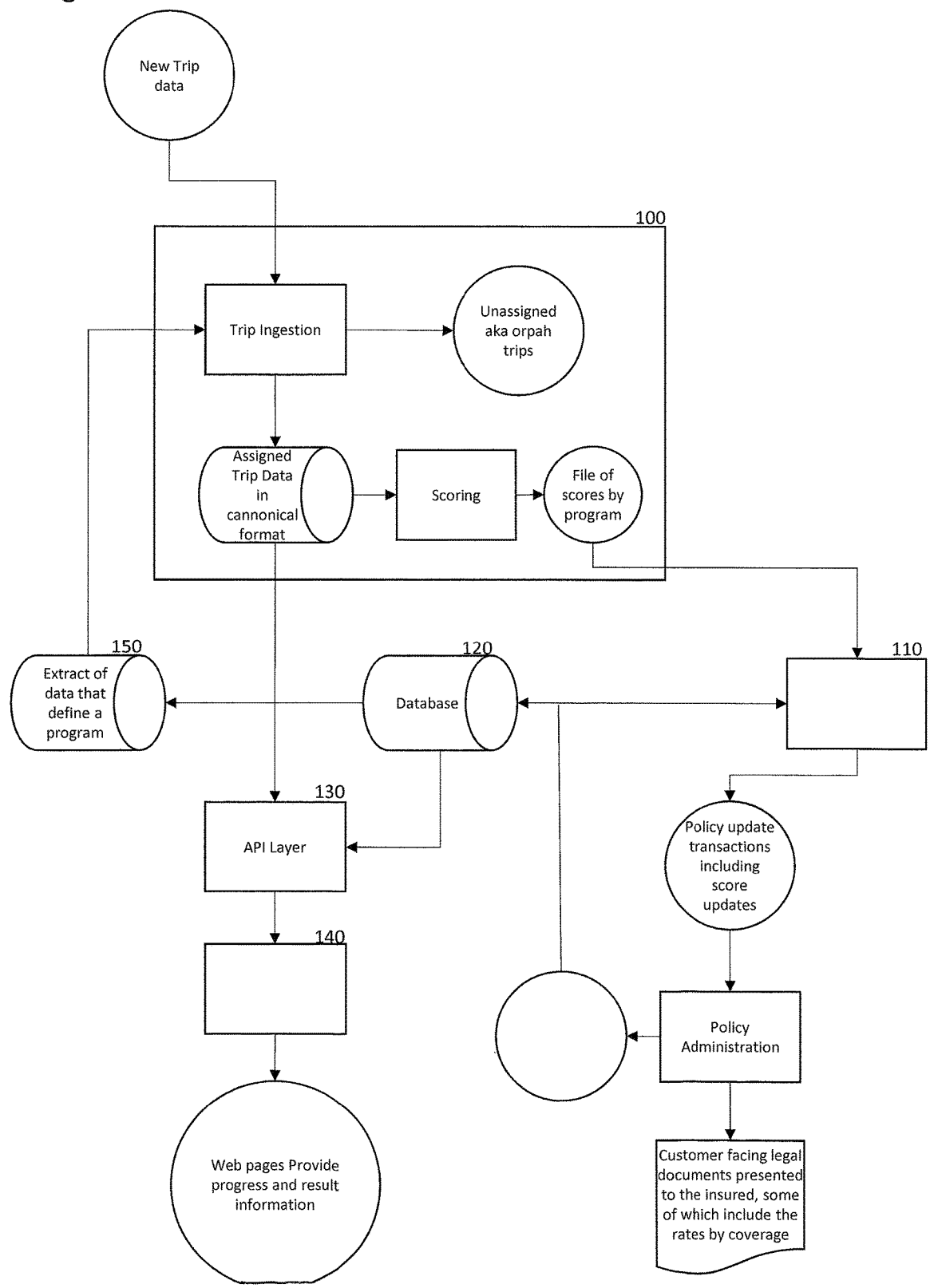
FIG. 1 illustrates a logical diagram of exemplary computer architecture in accordance with embodiments of the present invention.

The present invention relates to a telematics system and method that involves collection of data associated with the operation of a motor vehicle via a device and analysis of the data in connection with determining insurance rates and associated premiums.

In accordance with improved data processing methods of the present invention, processing of data representing operation of a motor vehicle is employed to determine variables that take into account the consistency of the operator's operation of the motor vehicle. More particularly, the additional processing takes into account the fact that changes in speed can be weighted by the speed at which the vehicle is travelling. The result of these variables rewards consistent driving regardless of the road conditions (i.e., traffic density and road type) and rewards less aggressive driving. More particularly, the aggregate functions deemphasize the importance of the distance traveled. For instance, driving 100 miles at a constant freeway speed of 65 mph will result in a lower score than driving for 5 miles in heavy stop-and-go traffic. The aggregate functions may also represent a proxy for traffic density and road type that would otherwise only be available via GPS data.

An aggregate function can be calculated by the following formula:

$$\text{Aggregate Function} = \sum_{1}^{n} \frac{(|S_t - S_{t-1}|)^x * \max(S_{t-1}, S_t)}{3600}$$

Where:
 $S_t$~Current Speed
 $S_{t-1}$~Prior Speed
 n~The number of observations used in calculating the aggregate.
 x~A power used to increase the predictive power of the variable.

There may be three subfamilies of the aggregate function, as follows:

Deceleration aggregate: only calculated if the change in speed is negative.

Acceleration aggregate: only calculated if the change in speed is positive.

Velocity aggregate: calculated regardless of the change in speed.

Each subfamily may be comprised of three members. These members are identified by the power that the DeltaSpeed term (e.g., |St−St−1|) term) of the equation is raised to. In preferred embodiments of the aggregate variables, the absolute value of the delta term is used so that the aggregate value is always positive. The variable x can take the values of 1, 1.5, or 2, in some embodiments, although other values may be used within the scope of the present invention. The power is included in the function because raising the delta term to a power other than 1 increases the predictive power of the variable.

In some embodiments, the rating model may include one variable from each subfamily and only two of the subfamilies would be represented, although variations may be made within the scope of the present invention.

The aggregate functions evaluate the consistency of speed while driving. Potentially, more consistent driving could represent less risky driving situations. An alternate method to measure consistency of speed would be to take the standard deviation of speeds and delta speeds over a specified time frame. As with the aggregate functions, the standard deviation functions may serve as a proxy for traffic density and road type. The following standard deviation calculations may be used in connection with the rating model, in accordance with an embodiment of the present invention.

The Standard Deviation variables may be calculated as follows:

Where:

$S_i$=Speed at time i.

X=Number of seconds over which the Standard Deviation is taken.

N=Number of Observations, could be less than X.

$D_i$=Change in speed.

$$StandardDeviationSpeedX = \sqrt{\frac{n \sum_{t-x+1}^{t} S_i^2 - \left(\sum_{t-x+1}^{t} S_i\right)^2}{n^2}}$$

$$StandardDeviationDeltaX = \sqrt{\frac{n \sum_{t-x+1}^{t} D_i^2 - \left(\sum_{t-x+1}^{t} D_i\right)^2}{n^2}}$$

The Standard Deviation speed variable may be used in a claim matching model (i.e., a model where each second represents a unique exposure and claims are assigned to the exact second the impact occurred). Alternatively, the Standard Deviation speed variable may be used in connection with the model scoring at a summary level. To do so, the standard deviation at each second is calculated and multiplied by the average speed over the X seconds. In the event that there are less than X observations (for instance, the standard deviation over 10 seconds taken at the fifth second of the trip), the Standard Deviation X is multiplied by the number of available observations divided by X.

The Standard Deviation variables may be taken into account in connection with scoring using the following equation:

$$SummaryStandardDeviationSpeedX = \left[\sqrt{\frac{n \sum_{t-x+1}^{t} S_i^2 - \left(\sum_{t-x+1}^{t} S_i\right)^2}{n^2}}\right] *$$

$$\left(\frac{\sum_{t-x+1}^{t} S_i}{n}\right) * \left(\text{IF } n < X \text{ THEN } \frac{n}{X} \text{ ELSE } 1\right)$$

$$SummaryStandardDeviationDeltaX = \left[\sqrt{\frac{n \sum_{t-x+1}^{t} D_i^2 - \left(\sum_{t-x+1}^{t} D_i\right)^2}{n^2}}\right] *$$

$$\left(\frac{\sum_{t-x+1}^{t} S_i}{n}\right) * \left(\text{IF } n < X \text{ THEN } \frac{n}{X} \text{ ELSE } 1\right)$$

The summary standard deviation variables may be used in the model at, e.g., 10 and 20 second intervals. Similar to the aggregate functions, the model may include one time frame for the summary standard deviation speed variable and one time frame for the summary standard deviation delta variable.

Three embodiments using the aggregate function are now described in more detail (i.e., one that involves exponentiated changes in speed, standard deviations in speed, and standard deviation in delta speed).

A first embodiment of the present invention involves use of exponentiated changes in speed weighted by distance traveled in connection with performing insurance rating. In such an embodiment, vehicle speed is detected on a predetermined time interval. A processor (i) determines the change in speed over a time interval, and takes that change to an exponential power (in some embodiments taking the absolute value of the change to an exponential power), (ii) determines the maximum speed of the vehicle when the change in speed occurs for the time interval (i.e., the greater of the two speeds at the start and end of the time interval), or determines the distance traveled by the vehicle over the time interval based on the greater of the two speeds defining the start and end of the time interval and the duration of the time interval (e.g., 1 second), and (iii) adjusts/determines the respective driver's driving score or rating corresponding to a magnitude of the change in speed relative to the distance traveled over the time interval.

The determination of the change in speed over the time interval to an exponential power increases the predictability of risk determined through the variable. Generally, as the exponential power increases, so does the level of predictability achieved by the variable (e.g., the change in speed to an exponential power of 2 is more predictive than the change in speed to an exponential power of 1 or 1.5). The exponentiated change in speed, thus, involves taking the change in speed and transforming it to optimize predictiveness of the variable.

The distance traveled over the time interval may be measured by taking the maximum speed (e.g., in KPH or other measurement of speed) between the two speeds at the start and end of the time interval (the time interval being, e.g., two sequential seconds) and dividing it by 3600 (based on 3600 seconds in 1 hour). Alternatively, the distance could be calculated by taking the average of the two speeds and dividing it by 3600.

All of the calculated end values (i.e., a calculated value for each second traveled) can be taken to generate a daily average or an average per kilometer, which can be taken into consideration in a model for determining/adjusting a driving score or rating (with the higher the average, the higher the risk).

A second embodiment involves use of the standard deviation in speed in connection with performing insurance rating. In such an embodiment, vehicle speed is detected on a predetermined time interval. A processor (i) determines the vehicle speed at each of a number of time points over a defined time interval (e.g., on a second by second basis over a rolling 10 second interval), (ii) calculates the standard deviation of speed for each time interval, (iii) takes the sum of all of the determined standard deviations for all of the time intervals (e.g., over a trip, day, or by per kilometer), (iv) divides the summed standard deviations by the number of days over which speed data has been collected (e.g., the number of days the OBD port plug-in device or mobile phone has collected data), and (v) adjusts/determines the respective driver's driving score or rating corresponding to the magnitude of the overall standard deviation of speed.

As an alternative to dividing the summed standard deviations by the number of days of data collection, the sum could be divided instead by the number of kilometers driven over a trip, a day, or any other observed time interval, by way of example.

Also, with observation of end values calculated using the above process, a threshold standard deviation of speed value could be established. This could be determined, for example, according to where a defined value of the standard deviation reveals a specific increase in the number of accidents. That threshold could be used to identify driving events, which in turn could be used in determining/adjusting driving scores or ratings.

A third embodiment differs from the second embodiment in that the delta speed (change in speed) is used in calculating the standard deviations, rather than the speed values themselves.

Additional factors that could be included in the analyses for the above-described embodiments are the total distance traveled over the trip (e.g., shorter distance traveled may have a higher associated risk), the type(s) of road traveled (and related duration) during the trip, and the speed limits for the roads traveled.

Thus, upon obtaining a set of data for each second of a trip, analysis may be performed to gain an understanding of the consistency of the driving. Such analysis may be performed using the first, second or third embodiments described herein. The formulas that may be used in connection with such embodiments are described as follows. In these formulas, aggregate and standard deviation functions should be built to six decimal places, in a preferred embodiment. The following variables are employed:

$S_t$~The scrubbed, non null, plausible speed at time t.

$D_t$~The change in speed from the prior second to the current second, calculated as $S_{t-1} - S_t$.

$|S_t|$~Absolute value of the expression.

$\text{Max}(S_t, S_{t-1})$~Use the maximum value between $S_t$ and $S_{t-1}$.

n~Number of observations.

t~Time from trip start.

DeltaSpeed: DeltaSpeed is defined as the change in speed between the prior second and the current second. It may be calculated as $$\text{DeltaSpeed} = S_t - S_{t-1}$$

DecelerationAggregate_1_0: If time from trip start is equal to 0 OR the current second or prior second is not plausible, then the DecelerationAggregate_1_0 is null. Otherwise:

$$\text{DecelerationAggregate\_1\_0} = \frac{(S_{t-1} - S_t) * S_{t-1}}{3600}$$

DecelerationAggregate_1_5: If time from trip start is equal to 0 OR the current second or prior second is not plausible, then the DecelerationAggregate_1_5 is null. Otherwise:

$$\text{DecelerationAggregate\_1\_5} = \frac{(S_{t-1} - S_t)^{1.5} * S_{t-1}}{3600}$$

DecelerationAggregate_2_0: If time from trip start is equal to 0 OR the current second or prior second is not plausible, then the DecelerationAggregate_2_0 is null. Otherwise:

$$\text{DecelerationAggregate\_2\_0} = \frac{(S_{t-1} - S_t)^2 * S_{t-1}}{3600}$$

AccelerationAggegate_1_0: If time from trip start is equal to 0 OR the current second or prior second is not plausible, then the AccelerationAggegate_1_0 is null. Otherwise:

$$\text{AccelerationAggregate\_1\_0} = \frac{(S_t - S_{t-1})^2 * S_t}{3600}$$

AccelerationAggregate_1_5: If time from trip start is equal to 0 OR the current second or prior second is not plausible, then the AccelerationAggregate_1_5 is null. Otherwise:

$$\text{AccelerationAggregate\_1\_5} = \frac{(S_t - S_{t-1})^{1.5} * S_t}{3600}$$

AccelerationAggregate_2_0: If time from trip start is equal to 0 OR the current second or prior second is not plausible, then the AccelerationAggregate_2_0 is null. Otherwise:

$$\text{AccelerationAggregate\_2\_0} = \frac{(S_t - S_{t-1})^2 * S_t}{3600}$$

VelocityAggregate_1_0: If time from trip start is equal to 0 OR the current second or prior second is not plausible, then the VelocityAggregate_1_0 is null. Otherwise:

$$\text{VelocityAggregate\_1\_0} = \frac{(|S_t - S_{t-1}|) * \max(S_{t-1}, S_t)}{3600}$$

VelocityAggregate_1_5: If time from trip start is equal to 0 OR the current second or prior second is not plausible, then the AccelerationAggregate_1_5 is null. Otherwise:

$$\text{VelocityAggregate\_1\_5} = \frac{(|S_t - S_{t-1}|)^{1.5} * \max(S_{t-1}, S_t)}{3600}$$

VelocityAggregate_2_0: If time from trip start is equal to 0 OR the current second or prior second is not plausible, then the AccelerationAggregate_2_0 is null. Otherwise:

$$\text{VelocityAggregate\_2\_0} = \frac{(|S_t - S_{t-1}|)^2 * \max(S_{t-1}, S_t)}{3600}$$

StandardDeviationSpeed010: If time from trip start is less than 2 OR at least 1 observation is not plausible between the current second and the ninth second prior, then the StandardDeviationSpeed010 is null. Otherwise:

$$StandardDeviationSpeed010 = \sqrt{\left(\frac{n\sum_{i=t-9}^{t} S_i^2 - \left(\sum_{i=t-9}^{t} S_i\right)^2}{n^2}\right)}$$

When aggregation is required, the StandardDeviationSpeed010 may be aggregated as:

$AggregateStandardDeviationSpeed010 =$ $$StandardDeviationSpeed010 * \frac{\sum_{i=t-9}^{t} S_i}{t-(t-9)+1} * \text{if}\left(t < 10 \text{ then } \frac{t}{10} \text{ else } 1\right)$$

StandardDeviationSpeed020: If time from trip start is less than 2 or at least 1 observation is not plausible between the current second and the nineteenth second prior, then the StandardDeviationSpeed020 is null. Otherwise:

$$StandardDeviationSpeed020 = \sqrt{\left(\frac{n\sum_{i=t-19}^{t} S_i^2 - \left(\sum_{i=t-19}^{t} S_i\right)^2}{n^2}\right)}$$

When aggregation is required, the StandardDeviationSpeed020 should be aggregated as:

$AggregateStandardDeviationSpeed020 =$ $$StandardDeviationSpeed020 * \frac{\sum_{i=t-19}^{t} S_i}{t-(t-19)+1} * \text{if}\left(t < 20 \text{ then } \frac{t}{20} \text{ else } 1\right)$$

StandardDeviationDelta010: If time from trip start is less than 2 or at least 1 observation is not plausible between the current second and the ninth second prior, then the StandardDeviationDelta010 is null. Otherwise:

$$StandardDeviationDelta010 = \sqrt{\left(\frac{n\sum_{i=t-9}^{t} D_i^2 - \left(\sum_{i=t-9}^{t} D_i\right)^2}{n^2}\right)}$$

When aggregation is required, the StandardDeviationSpeed010 should be aggregated as:

$AggregateStandardDeviationDelta010 =$ $$StandardDeviationDelta010 * \frac{\sum_{i=t-9}^{t} S_i}{t-(t-9)+1} * \text{if}\left(t < 10 \text{ then } \frac{t}{10} \text{ else } 1\right)$$

StandardDeviationDelta020: If time from trip start is less than 2 or at least 1 observation is not plausible between the current second and the nineteenth second prior, then the StandardDeviationDelta020 is null. Otherwise:

$$StandardDeviationDelta020 = \sqrt{\left(\frac{n\sum_{i=t-19}^{t} D_i^2 - \left(\sum_{i=t-19}^{t} D_i\right)^2}{n^2}\right)}$$

When aggregation is required, the StandardDeviationSpeed020 should be aggregated as:

$AggregateStandardDeviationDelta010 =$ $$StandardDeviationDelta020 * \frac{\sum_{i=t-9}^{t} S_i}{t-(t-19)+1} * \text{if}\left(t < 20 \text{ then } \frac{t}{20} \text{ else } 1\right)$$

By way of example, for 10 second standard deviations, the following trip subset of 10 seconds would have the StandardDeviationSpeed010 calculated as follows:

| Position Time Stamp | Time From Trip Start | VSSSpeed_Am | Delta |
|---|---|---|---|
| 2014 Mar. 15 10:08:45 | 111 | 45 | 3 |
| 2014 Mar. 15 10:08:46 | 112 | 50 | 5 |
| 2014 Mar. 15 10:08:47 | 113 | 55 | 5 |
| 2014 Mar. 15 10:08:48 | 114 | 61 | 6 |
| 2014 Mar. 15 10:08:49 | 115 | 63 | 2 |
| 2014 Mar. 15 10:08:50 | 116 | 62 | −1 |
| 2014 Mar. 15 10:08:51 | 117 | 63 | 1 |
| 2014 Mar. 15 10:08:52 | 118 | 54 | −9 |
| 2014 Mar. 15 10:08:53 | 119 | 45 | −9 |
| 2014 Mar. 15 10:08:54 | 120 | 38 | −7 |

$$\sum_{i=t-9}^{t} S_i^2 =$$
$$45^2 + 50^2 + 55^2 + 61^2 + 63^2 + 62^2 + 63^2 + 54^2 + 45^2 + 38^2 = 29{,}438$$

$$\sum_{i=t-9}^{t} S_i = 45 + 50 + 55 + 61 + 63 + 62 + 63 + 54 + 45 + 38 = 536$$

$$StandardDeviationSpeed010 = \sqrt{\left(\frac{10*29{,}438 - 536^2}{10^2}\right)}$$

$StandardDeviationSpeed010 =$ $$\sqrt{\frac{294{,}380 - 287{,}296}{100}} = \sqrt{\frac{7084}{100}} = \sqrt{70.84} = 8.416650$$

$$\sum_{i=t-9}^{t} D_i^2 = 3^2 + 5^2 + 5^2 + 6^2 + 2^2 + -1^2 + 1^2 + -9^2 + -9^2 + -7^2 = 312$$

$$\sum_{i=t-9}^{t} D_i = 3 + 5 + 5 + 6 + 2 - 1 + 1 - 9 - 9 - 7 = -4$$

$$StandardDeviationDelta010 = \sqrt{\left(\frac{10*312 - (-4)^2}{10^2}\right)}$$

$$StandardDeviationDelta010 = \sqrt{\frac{3{,}120 - 16}{100}} = \sqrt{31.04} = 5.571355$$

A device is used to collect data associated with the operation of a motor vehicle. The device may be any device that is capable of receiving and transmitting data in accordance with the methodology described herein and collecting speed and associated time stamps. For example, the device may be a device that connects to and receives data from (wirelessly or wired) the on-board diagnostics system of a vehicle, or may be a mobile phone that either collects data from the on-board diagnostics system of a vehicle or has the capability to sense/collect vehicle data itself. By way of specific example, the device may be an OBD-II plug-in device that pulls, at a minimum, position timestamp and speed. The device may also be a smart phone application that pulls either GPS latitude and longitude or GPS speed and the position timestamp. The device may also be a connected car that provides, at a minimum, speed and position timestamp. All collection methods are within the scope of the present invention, so long as speed and time stamps are collected. The device transmits the data that it collects, e.g., wirelessly, over a computer network or using cellular telephone communications.

Once collected by device, the data may be transmitted to a data aggregator. In other embodiments, a data aggregator is not used and the data is transmitted directly to the entity that is to process the data and use such data in connection with determining driver safety ratings.

With reference to FIG. 1, an exemplary logical computer architecture that may be used to implement embodiments of the present invention is illustrated. New trip data is received by analytics server 100 (e.g., from a data aggregator, or directly). The trip data is ingested, which involves, in an exemplary embodiment, standardization of the data and auditing. Auditing may involve checking for duplicates; determining the number of trips, including start and stop times; and comparing data from trip summaries and cumulative trips for consistency and balancing. Data for orphan trips (i.e., data that cannot be assigned to a trip based on the vehicle identification number (VIN) and the device identifier) are stored for later processing and assignment. After the ingestion step, the data is loaded into the canonical model. The canonical model processing allows for all received data, regardless of its source, recorded on a second by second basis for each trip, to be loaded into a single table for further processing. The data in the table may then be scored in accordance with the aggregate functions described in detail herein.

Once determined, the score data is sent to rate processing server 110. Rate processing server 110 processes the score data to determine whether discounts and/or policy adjustments are available. Score data is stored in database 120. The consumer's policy file is updated with newly calculated score information and administration is performed on the consumer's automobile insurance policy to reflect a new rating based on the score. The consumer is presented with new policy documents, which reflect any new rate offered based on the score.

Referring back now to the processing of trip data using the canonical model, such data is also transmitted to API layer 130, which inputs the data into web server 140. Web server 140 hosts the web site that allow consumers to review their trip data (e.g., summarized on a daily, weekly, and monthly basis, as well as totals), scores and projected discounts via the Internet. Such information may be pushed to end users via a mobile telephone application, or sent via electronic mail or text.

Certain data is also extracted from database 120 into database 150 and fed back into analytics server 100. This data is continually reviewed against trip data received by analytics server 100 in an attempt to match up orphan trip information.

Figure 2:
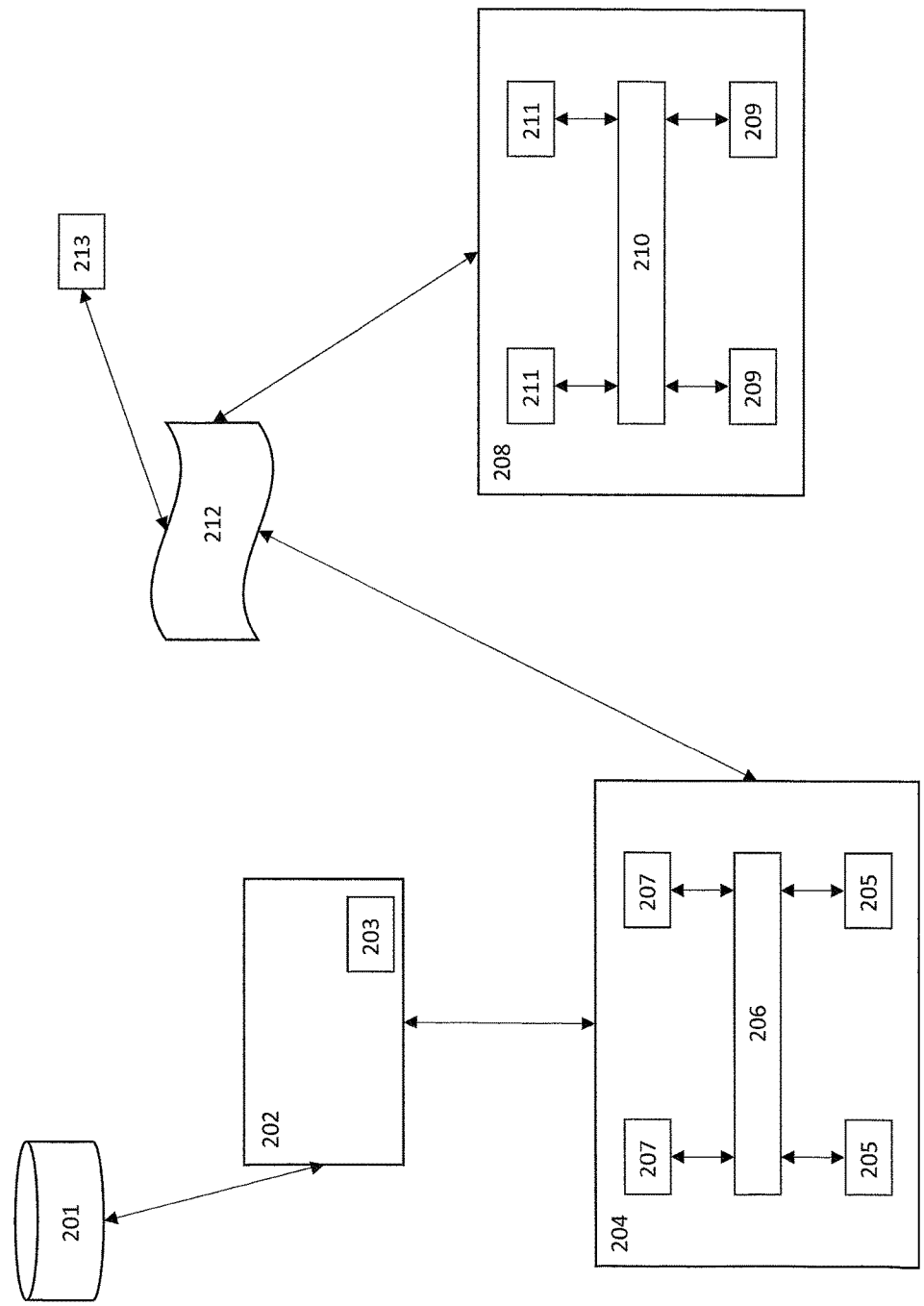
FIG. 2 illustrates an exemplary system architecture of the present invention.

In some embodiments, the methods are carried out by a system that employs a client/server architecture such as, for example, the collection of components illustrated and described with reference to FIG. 1. Such exemplary embodiments are described as follows with reference to FIG. 2. The data that may be used as an input to the system, and the outputs from the system, may be stored in one or more databases 201. Database server(s) 202 may include a database services management application 203 that manages storage and retrieval of data from the database(s) 201. The databases 201 may be relational databases; however, other data organizational structures may be used without departing from the scope of the present invention.

One or more application server(s) 204 are in communication with the database server 202. The application server 204 communicates requests for data to the database server 202. The database server 202 retrieves the requested data. The application server 204 may also send data to the database server 202 for storage in the database(s) 201. The application server 204 comprises one or more processors 205, non-transitory computer readable storage media 207 that store programs (computer readable instructions) for execution by the processor(s), and an interface 206 between the processor(s) 205 and computer readable storage media 207. The application server 204 may store the computer programs referred to herein.

To the extent data and information is communicated over a network (e.g., the Internet or an Intranet), one or more network servers 208 may be employed. The network server 208 also comprises one or more processors 209, computer readable storage media 211 that store programs (computer readable instructions) for execution by the processor(s), and an interface 210 between the processor(s) 209 and computer readable storage media 211. The network server 208 is employed to deliver content that can be accessed through the communications network 212, e.g., by an end user employing computing device 213. When data is requested through an application, such as an Internet browser, the network server 208 receives and processes the request. The network server 208 sends the data or application requested along with user interface instructions for displaying a user interface on device 213.

The computers referenced herein are specially programmed to perform the functionality described herein.

The non-transitory computer readable storage media (e.g., 207 or 211) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

A computer is required to process the data gathered by the device at least because the volume of data processed by the system is extraordinarily large—e.g., hundreds of millions of seconds of driving data on a daily basis. In addition, the data scrubbing rules are very complex and a computer is required to execute the scrubbing rules within the time allotted for batch processing.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A vehicle data collection and evaluation system comprising:
   a vehicle data collection device configured to collect data associated with an operation of a vehicle;
   a transmitter configured to transmit the collected data;
   an analytics server configured to receive the collected data transmitted by the transmitter and to process the collected data;
   a rate processing server configured to determine a driver safety rating;
      wherein the collected data comprises vehicle speed measured at a predetermined time interval and the analytics server (i) determines a change in speed value over the predetermined time interval and raises the change in speed value to an exponential power to determine an exponentiated change in speed value; (ii) determines a maximum speed of the vehicle during the predetermined time interval; and (iii) determines the driver safety rating based on the maximum speed and a magnitude of the exponentiated change in speed value relative to a distance traveled over the predetermined time interval.

2. The system of claim 1, wherein the predetermined time interval is a second.

3. The system of claim 1, wherein determining the maximum speed of the vehicle comprises determining a greater of a speed measured at a start of the predetermined time interval and a speed measured at an end of the predetermined time interval.

4. The system of claim 1, wherein determining the maximum speed of the vehicle comprises determining a distance traveled by the vehicle over the predetermined time interval based on a greater of a speed measured at a start of the predetermined time interval and a speed measured at an end of the s predetermined time interval and a duration of the time interval.

5. The system of claim 1, wherein the analytics server determines an absolute value of the change in speed value and raises the absolute value of the change in speed value to the exponential power.

6. The system of claim 1, wherein the exponential power is 2.

7. The system of claim 1, wherein the vehicle data collection device is configured to connect to and receive data from an on-board diagnostics system of the vehicle.

8. The system of claim 1, wherein the vehicle data collection device comprises a mobile phone.

* * * * *